United States Patent
Spaeth

(12) 
(10) Patent No.: US 6,353,970 B1
(45) Date of Patent: Mar. 12, 2002

(54) FOLDABLE SEAT HINGE

(75) Inventor: Kenneth A. Spaeth, Two Rivers, WI (US)

(73) Assignee: Estran Corporation, Two Rivers, WI (US)

(*) Notice: Subject to any disclaimer, the term of this patent is extended or adjusted under 35 U.S.C. 154(b) by 0 days.

(21) Appl. No.: 09/438,009

(22) Filed: Nov. 10, 1999

(51) Int. Cl.7 .................................................. B60N 2/02
(52) U.S. Cl. .............................. 16/360; 16/363; 16/376; 297/378.1
(58) Field of Search ........................... 16/273, 348, 357, 16/358, 360, 363, 374, 376, 377, 359, 361; 297/376, 378.1

(56) References Cited

U.S. PATENT DOCUMENTS

| | | | | |
|---|---|---|---|---|
| 403,772 A | * | 5/1889 | Old ............................. | 16/376 |
| 814,288 A | * | 3/1906 | Hausfeld et al. .............. | 16/360 |
| 875,251 A | * | 12/1907 | Field ......................... | 16/273 X |
| 1,076,689 A | * | 10/1913 | McKinney .................... | 16/273 |
| 1,555,781 A | | 9/1925 | Amsden .................... | 16/357 X |
| 2,488,222 A | * | 11/1949 | Morgan .................... | 16/363 X |
| 3,065,498 A | | 11/1962 | Johnson | |
| 3,117,708 A | * | 1/1964 | Goldman .................. | 16/376 X |
| 3,231,927 A | | 2/1966 | Ammon | |
| 3,740,791 A | | 6/1973 | Bulin | |
| 4,869,529 A | * | 9/1989 | Hoffman et al. .......... | 16/363 X |
| 4,953,259 A | | 9/1990 | Frye et al. | |
| 5,052,076 A | | 10/1991 | Spaeth | |
| 5,116,099 A | * | 5/1992 | Kwasnik et al. .......... | 16/360 X |
| 5,172,969 A | | 12/1992 | Reuter et al. | |
| 5,334,354 A | * | 8/1994 | Johnston et al. .......... | 16/374 X |
| 5,725,279 A | | 3/1998 | Ward et al. | |
| 5,956,810 A | | 9/1999 | Spaeth | |
| 6,045,190 A | * | 4/2000 | Ward et al. ............... | 297/378.1 |

FOREIGN PATENT DOCUMENTS

| DE | 303624 | * | 2/1918 | ................. 16/358 |
|---|---|---|---|---|
| FR | 703111 | * | 4/1931 | ................. 297/376 |
| IT | 625400 | | 9/1961 | |

* cited by examiner

Primary Examiner—Lynne H. Browne
Assistant Examiner—David E. Bochna
(74) Attorney, Agent, or Firm—Ryan Kromholz & Manion, S.C.

(57) ABSTRACT

The present invention relates to the field of hinges, and specifically, to seat hinges of the type used for foldable boat seats. A hinge including two seat cushion supporting members and a back plate is taught. One supporting member has a peripheral recess facing outwardly relative to a pivot pin and forms a generally u-shaped area. Laterally spaced-apart abutment surfaces extend angularly from the u-shaped area. The other supporting member is provided with an upstanding protuberance which cooperates with the abutments to limit the hinge between its fully closed and fully opened positions.

14 Claims, 4 Drawing Sheets

FOLDABLE SEAT HINGE

BACKGROUND OF THE INVENTION

The present invention relates to the field of hinges and, specifically, to seat hinges of the type used for foldable boat seats. This type of seat has a back that is foldable over the seat.

A number of hinges are known in prior art. One commonly known hinge is comprised of a pair of metal angles fastened together with a large rivet. One angle is bolted to the seat bottom and the other to the seat back such that the rivet serves as a pivot for the hinge. A hinge of this type can pinch the fingers of the user if the user puts a hand between the part of the hinge while the seat is being positioned.

Another commonly used hinge is made of two molded heat resistant material pieces. Each piece has a hinge guide portion surrounding its pivot point. The hinge guide portion has the form of an arc drawn about the pivot point. The two arcs fit closely with one another and do not separate, regardless of the orientation of the seat back. This hinge configuration always results in the two hinge guide portions overlapping one another without any gap. This prevents finger pinch during repositioning of the seat back. U.S. Pat. No. 5,052,076, assigned to the same assignee as the present invention, discloses a hinge of this type in which the hinge pivot has a generally circular outer pivot wall on one section of the hinge, and a circular inner pivot wall on the other section of the hinge. The inner wall is provided with ears that project at right angles to the top of the inner wall and the outer wall is provided with relieved sections that allow the ears to pass through the outer wall in only one orientation.

Another prior art seat is made out of two sections coupled by means of a fastener and two plastic pins. Both sections have one planar, circular end, each one parallel to the other. The planar, circular end of one section has a first aperture and two arcuate channels formed therein. The parallel end of the second section includes three apertures disposed to be aligned with the first aperture and two arcuate channels in the first section. The hinge further comprises a planar, circular intermediate plate that is parallel to and adjacently coupled to the planar, circular end of each section. The intermediate plate is provided with three apertures disposed to be aligned with the apertures and channels. The hinge is further provided with a planar, circular back plate, parallel and adjacently coupled to the first section end, opposite the intermediate plate.

The present invention represents a substantial improvement of co-pending application Ser. No. 09/075,021, assigned to the same assignee as the present invention. This invention reduces the number of parts needed for production while maintaining total product quality.

SUMMARY OF THE INVENTION

The present invention is a seat hinge of the type used on boat seats, especially foldable boat seats. Among the objects of the present invention is to provide a hinge comprising two sections securely coupled together and provided with integral stopping means to prevent fingers or other objects from being pinched therebetween when the seat is put in a folded configuration.

The first section of the hinge is L-shaped and includes an integrally formed supporting leg portion and a connecting leg portion. The connecting leg portion is substantially planar and has a pivot aperture formed therein. The second section of the hinge includes a connecting portion and a laterally extending support portion. The connecting portion of the second section is substantially planar and adjacently coupled to the connecting leg portion of the L-shaped section by way of a coupling pivot pin extending normal to the plane of the second section and through the pivot aperture. The connecting portion of the second section is further provided with a protuberance which is radially spaced from the coupling pivot pin. This protuberance is preferably in the form of an upstanding pin, however it is to be understood that the protuberance could be in any other form, such as an integrally formed raised area, or an upstruck flange area.

The connecting leg portion of the L-shaped section further includes a peripheral recess. The peripheral recess faces radially outward relative to the pivot pin and is configured to form a generally U-shaped area. Laterally spaced-apart abutment surfaces extend angularly from the U-shaped area. The abutment surfaces cooperate with the protuberance to stop relative rotative motion of the two hinge sections. The protuberance will travel from one abutment surface to the other. Therefore, the hinge may be moved from a position in which the hinge sections form the greatest angle with respect to one another to a position in which the angle formed is minimal.

The hinge further comprises a circular substantially planar back plate, parallel to the connecting leg portion of the L-shaped section and the connecting portion of the second section and adjacently coupled to the connecting leg portion of the L-shaped portion. The back plate further comprises at least one back plate aperture, axially disposed to be aligned with the pivot pin aperture in the connecting leg portion of the L-shaped section. In the preferred embodiment the back plate is further provided with an aperture axially disposed to be aligned with the preferred protuberance, upstanding pin, but in alternate embodiments using other types of protuberances, the aperture is not necessary.

DETAILED DESCRIPTION

Although the disclosure hereof is detailed and exact to enable those skilled in the art to practice the invention, the physical embodiments herein disclosed merely exemplify the invention which may be embodied in other specific structure. While the preferred embodiment has been described, the details may be changed without departing from the invention, which is defined by the claims.

Figure 1:
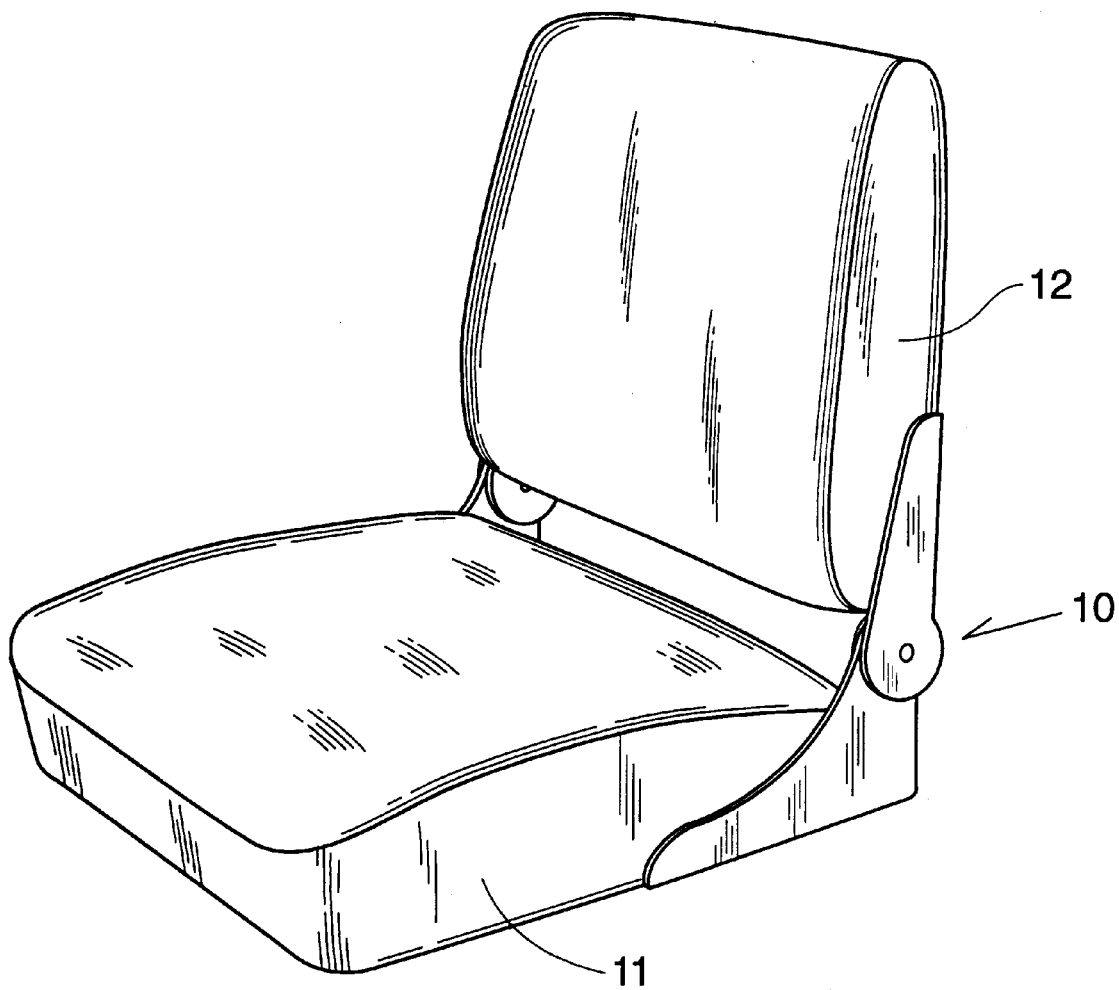
FIG. 1 is a perspective view of the seat hinge attached to a foldable boat seat.
Figure 2:
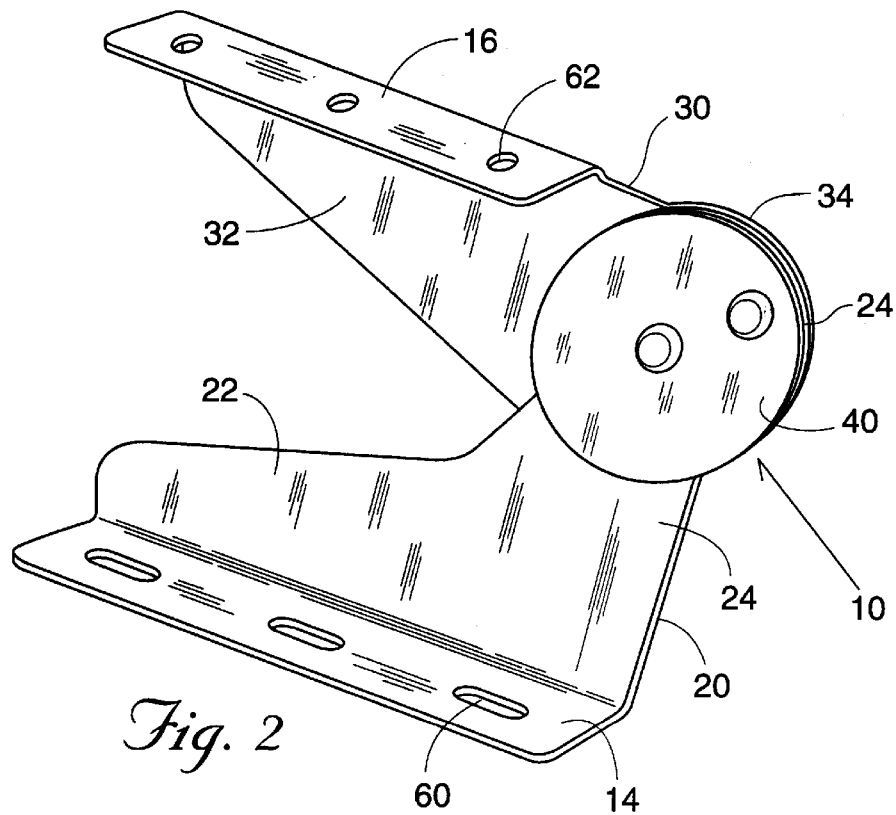
FIG. 2 is a perspective view of the seat hinge.

Referring to FIGS. 1 and 2, the seat hinge is generally shown as 10. FIG. 1 shows the way the hinge 10 attaches to the seat bottom 11 and the seat back 12.

Figure 3:
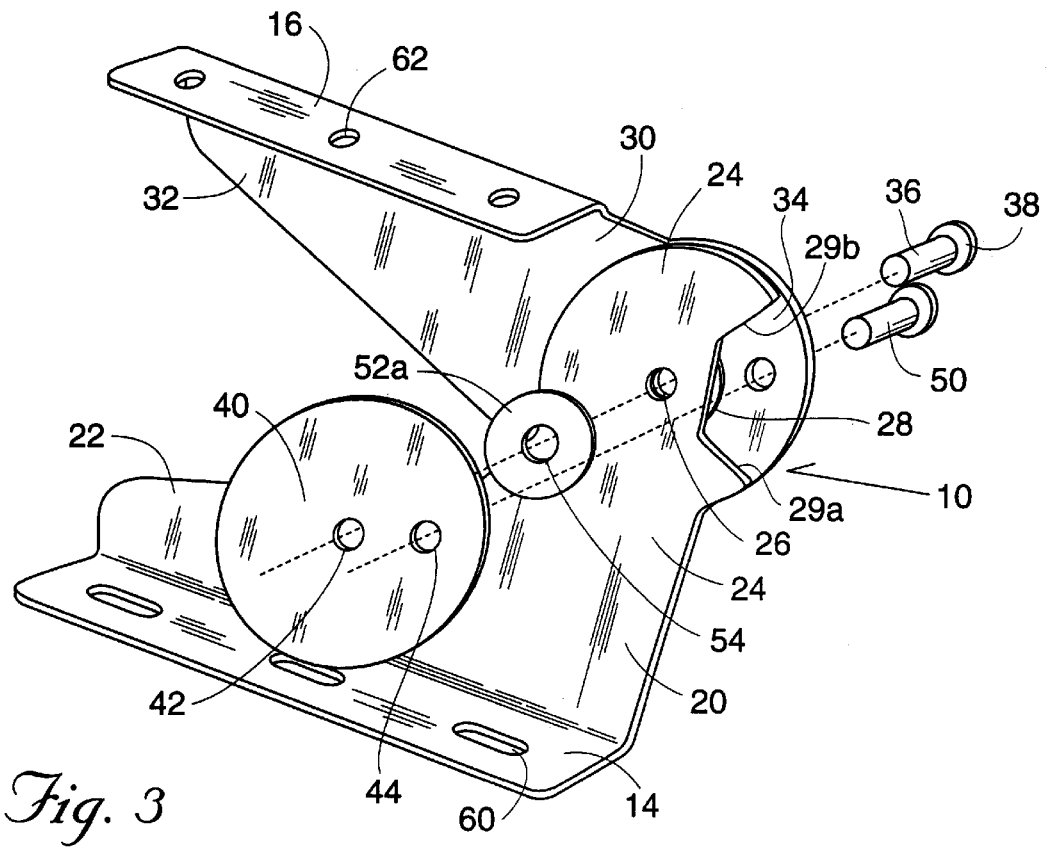
FIG. 3 is a perspective view of the seat hinge in a partially exploded condition.
Figure 4:
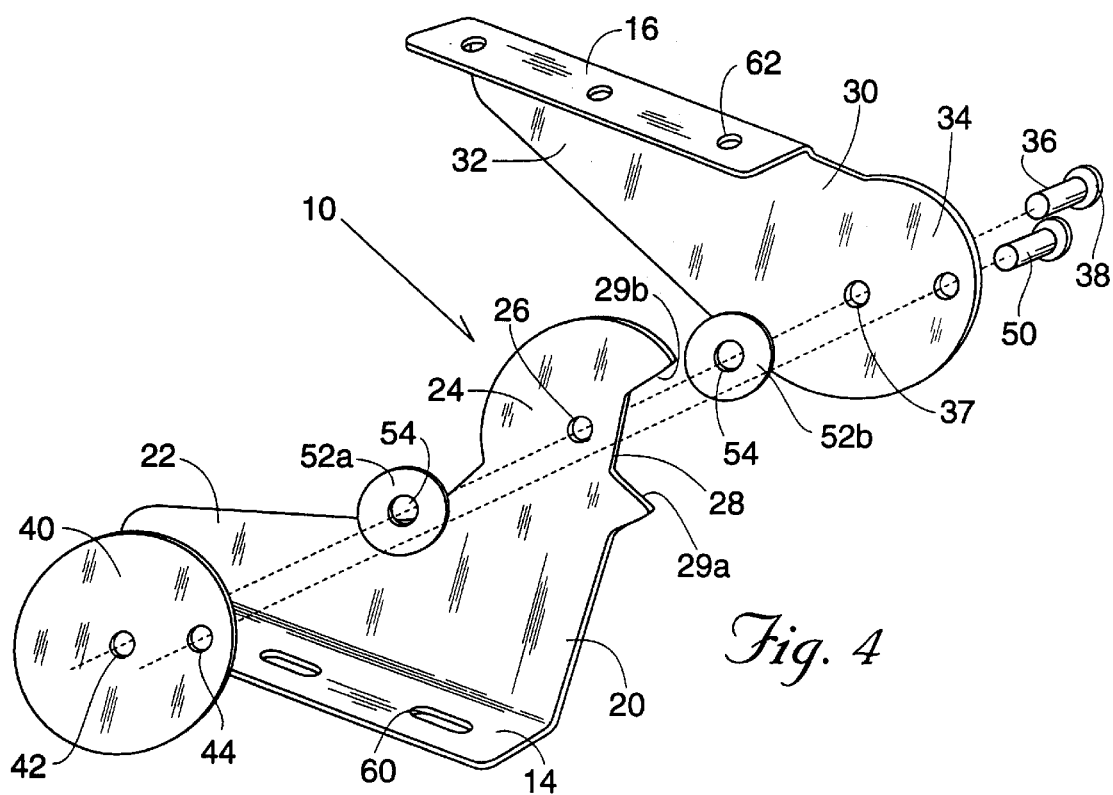
FIG. 4 is a perspective view of the seat hinge in an exploded condition.

Referring to FIGS. 2–4, the hinge 10 comprises an L-shaped section 20, a second section 30, and a back plate 40 coupled together using pivot pin 36. L-shaped section 20 includes an integrally formed supporting leg portion 22 and a connecting leg portion 24. Supporting leg portion 22 includes an outwardly extending flange portion 14. Flange portion 14 has a plurality of elongated apertures 60 and attaches to the seat bottom 11 as shown in FIG. 1. The connecting leg portion 24 is substantially planar and has a pivot aperture 26 formed therein. The second section 30 includes a laterally extending support portion 32 and a connecting portion 34. Laterally extending support portion 32 further includes an outwardly extending flange portion 16 having a plurality of apertures 62 and attaches to seat back 12 as shown in FIG. 1. A pivot pin 36, such as a semi-tubular rivet, extends normal to the plane of second section 30 and through pivot aperture 26 in connecting leg portion 24, and aperture 37 in connecting portion 34, thereby coupling the connecting leg portion 24 of L-shaped section 20 to the connecting portion 34 of second section 30. The connecting portion 34 of second section 30 is further provided with a protuberance, radially spaced from the pivot pin 36. As seen in FIGS. 3–7, the protuberance is preferably in the form of an upstanding pin 50. In the preferred embodiment, a step-rivet having a shoulder portion is utilized. The protuberance may take the form of alternate embodiments such as an upstanding flange or bumped and drawn area on connecting portion 34.

Figure 5:
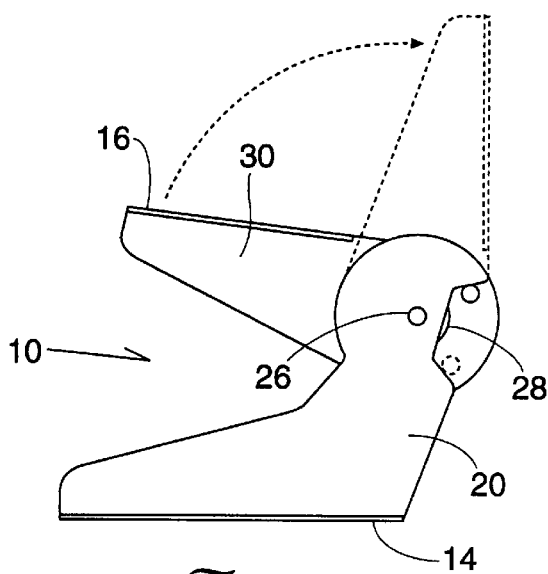
FIG. 5 is a side elevational view of the seat hinge, showing the relationship of the two sections of the seat hinge, with upright position shown in phantom.
Figure 6:
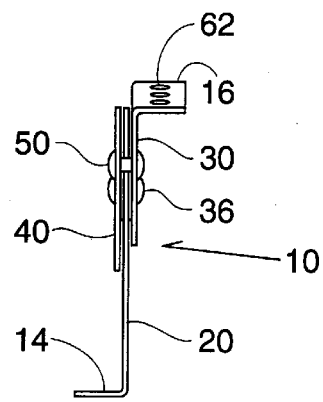
FIG. 6 is an end elevational view of the seat hinge.
Figure 7:
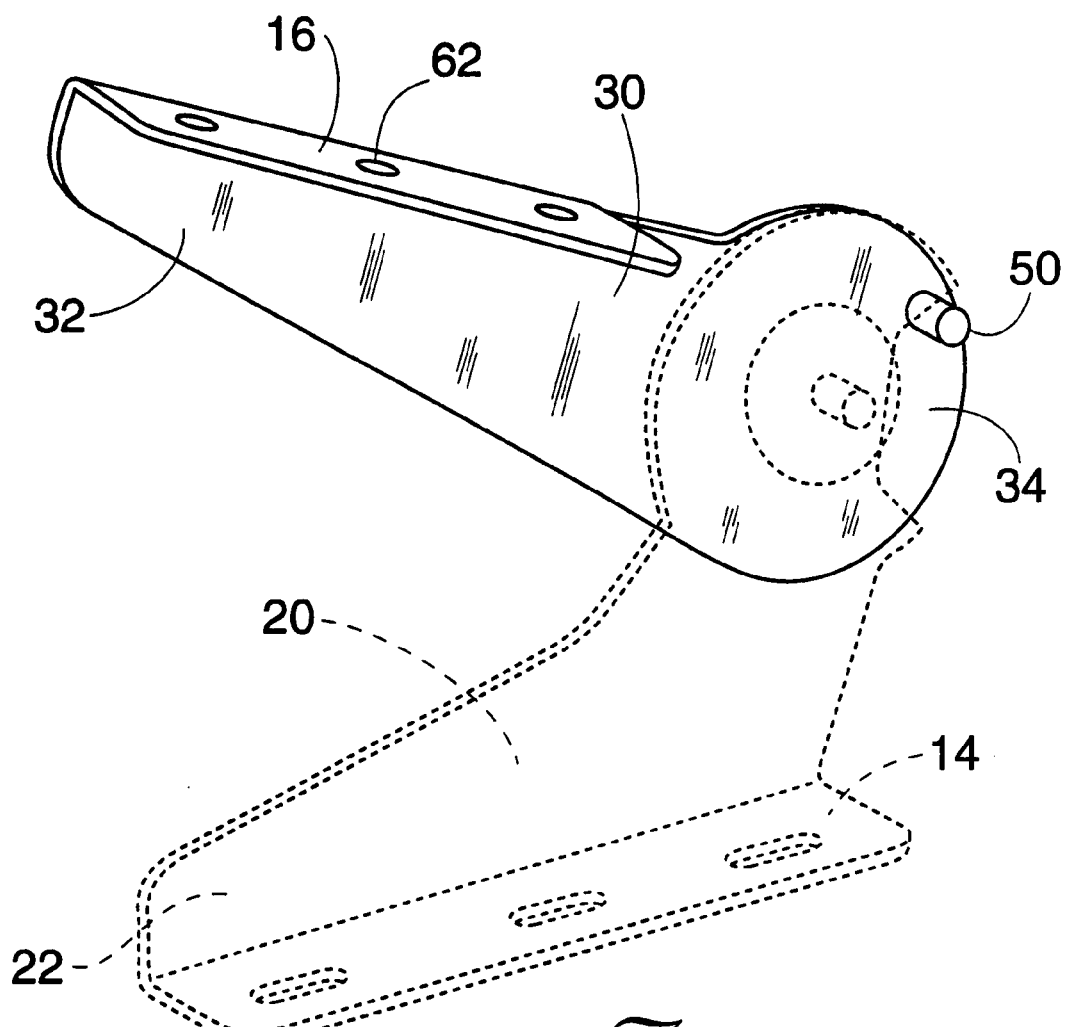
FIG. 7 is a perspective view of the seat hinge with the L-shaped section in phantom.

As seen in FIGS. 3–5, the connecting leg portion 24 of L-shaped section 20 is further provided with a peripheral recess 28. The peripheral recess 28 faces radially outward relative to the pivot pin 36. As best viewed in FIG. 4, the peripheral recess 28 is preferably U-shaped and has laterally spaced-apart abutment surfaces 29a, 29b extending from the peripheral recess 28. Abutment surfaces 29a, 29b cooperate with the protruding upstanding pin 50 to stop relative rotative motion of hinge sections 20 and 30. FIG. 5 illustrates the relative motion of hinge sections 20 and 30, and shows second section 30 in a position forming a minimal angle, while second section 30 at its most extended state is shown in phantom.

Referring also to FIGS. 3 and 4, a back plate 40 is provided. The back plate 40 is substantially planar and circular, and is adjacently coupled and substantially parallel to the connecting leg portion 24 of L-shaped section 20 so as to be situated opposite the connecting portion 34 of second section 30. In the preferred embodiment, back plate 40 includes a back plate pivot aperture 42 and a back plate protuberance aperture 44 radially spaced from the pivot aperture 42. Back plate pivot aperture 42 has a diameter slightly larger than the diameter of the pivot pin 36 and is dimensioned to house the pivot pin 36. Back plate aperture 42 is disposed to allow it to correspond with pivot aperture 26. The back plate 40 is preferably made out of steel.

As seen in FIGS. 3 and 4, the hinge 10 is further provided with washers 52a, 52b. Washers 52a, 52b are substantially planar and circular. Washer 52a is adjacently coupled and substantially parallel to back plate 50 and connecting leg portion 24, and washer 52b is adjacently coupled and substantially parallel to connecting leg portion 24 and connecting portion 34. Washers 52a, 52b are each provided with an aperture 54 for receiving the pivot pin 36. While the washers may be fabricated from any desirable material, compressed graphite 7075 is the preferred material. The graphite is capable of withstanding the heat of a paint drying oven while still providing a smooth, non-binding folding action of the assembled hinge.

In order to provide better shock resistance and minimizing the possibility of failure, the pivot pin 36 is also preferably made out of steel. The pivot pin 36 has at least one end 38 with an end diameter slightly larger than the diameter of the back plate aperture 42. If desired, the pivot pin 36 may extend through the back plate aperture 42, pivot aperture 26 and a corresponding aperture in connecting portion 34. The end 38 of pivot pin 36 is deformed or swaged after assembly of the hinge 10.

Referring to FIGS. 1, 2 and 5, once the two sections 20 and 30 are assembled by fastening the corresponding connecting portions 22 and 34 and the back plate 40, the seat bottom 11 is bolted to the flange portion 14 of connecting portion 22 and the seat back 12 is bolted to the flange portion 16 of connecting portion 32. As shown in FIGS. 2 and 5, the assembled hinge 10 may be rotated about its pivot point having an axis defined by the pivot pin 36, the pivot pin aperture 26 in connecting leg portion 24, the back plate aperture 42, and the pivot pin aperture 37 in connecting portion 34. Referring now to FIG. 5, the protuberance 50 will only travel between abutment surfaces 29a, 29b of peripheral recess 28. Therefore, the hinge 10 may be moved from a position in which the hinge sections 20 and 30 form the greatest angle to one another to a position where the angle formed is minimal.

The foregoing is considered as illustrative only of the principles of the invention. Furthermore, since numerous modifications and changes will readily occur to those skilled in the art, it is not desired to limit the invention to the exact construction and operation shown and described. While the preferred embodiment has been described, the details may be changed without departing from the invention, which is defined by the claims.

What is claimed is:

1. A hinge for connecting a folding seat back to a seat bottom, the folding seat back being movable between generally upright and folded positions with respect to the seat bottom, the seat hinge comprising;

an L-shaped section including an integrally formed supporting leg portion and a connecting leg portion;

a second section including a connecting portion and a laterally extending support portion;

said connecting leg portion of said L-shaped section and said connecting portion of said second section being substantially planar and adjacently coupled to one another;

said connecting leg portion of said L-shaped section having a pivot aperture formed therein;

said connecting portion of said second section having a coupling pivot pin extending normal to the plane of said second section and through said pivot aperture;

a single protuberance radially spaced from said pivot pin and extending normal to the plane of said connecting portion of said second section; and said connecting leg portion of said L-shaped section including a peripheral recess, said recess having a configuration comprised of laterally spaced-apart abutment surfaces arranged for alternative contact with said single protuberance for limiting relative rotative motion of said sections.

2. The hinge of claim 1 further comprising a back plate, said back plate being substantially planar and parallel to said connecting leg portion of said L-shaped section and to said connecting portion of said second section and adjacently coupled to said connecting leg portion of said L-shaped portion.

3. The hinge of claim 1 wherein said coupling pivot pin is provided with ends having an end diameter slightly larger than a diameter of said aperture.

4. The hinge of claim 1 further comprising friction-reducing washer members, said washer members being substantially planar and seated between respective adjacent sections and the back plate.

5. The hinge of claim 1 wherein said recess faces radially outward relative to said pivot pin and is configured to form a generally U-shaped area and wherein said spaced-apart abutting surfaces extend angularly from said U-shaped area.

6. The hinge of claim 1 wherein the connecting portion of said second section is provided with an aperture radially spaced from said pivot aperture in said connecting leg portion of said L-shaped section, and adapted to receive said single protuberance.

7. The hinge of claim 1 wherein said protuberance comprises an upstanding pin supported by said connecting portion of said second section.

8. A hinge for connecting a folding seat back to a seat bottom, the folding seat back being movable between generally upright and folded positions with respect to the seat bottom, the seat hinge comprising;

an L-shaped section including an integrally formed supporting leg portion and a connecting leg portion;

a second section including a connecting portion and a laterally extending support portion;

said connecting leg portion of said L-shaped section and said connecting portion of said second section being substantially planar and adjacently coupled to one another;

said connecting leg portion of said L-shaped section having a pivot aperture formed therein;

said connecting portion of said second section having a coupling pivot pin extending normal to the plane of said second section and through said pivot aperture;

a single protuberance radially spaced from said pivot pin and extending normal to the plane of said connecting portion of said second section; and said connecting leg portion of said L-shaped section including a peripheral recess, said recess facing radially outward relative to said pivot pin and configured to form a generally U-shaped area;

said connecting leg portion of said L-shaped section further including spaced-apart abutting surfaces, said spaced apart abutment surfaces extending angularly from said U-shaped area;

said abutment surfaces cooperating with said single protuberance to stop relative motion of said L-shaped section and said second section.

9. The hinge of claim 8 further comprising a back plate, said back plate being substantially planar and parallel to said connecting leg portion of said L-shaped section and to said connecting portion of said second section and adjacently coupled to said connecting leg portion of said L-shaped portion.

10. The hinge of claim 9 wherein said protuberance has a first end and a second end, said first end being affixed to said second section and said second end being affixed to said back plate.

11. The hinge of claim 8 further comprising friction-reducing washer members, said washer members being substantially planar and seated between respective adjacent sections and the back plate.

12. The hinge of claim 8 wherein the connecting portion of said second section is provided with an aperture radially spaced from said pivot aperture in said connecting leg portion of said L-shaped section, and adapted to receive said single protuberance.

13. The hinge of claim 8 wherein said protuberance comprises an upstanding pin supported by said connecting portion of said second section.

14. The hinge of claim 8 wherein said coupling pivot pin is provided with ends having an end diameter slightly larger than a diameter of said aperture.

* * * * *